(12) United States Patent  
Davis

(10) Patent No.: US 8,950,760 B1  
(45) Date of Patent: Feb. 10, 2015

(54) THREE WHEELED AUTOMOTIVE DOLLY AND METHOD OF USE

(71) Applicant: Steven S. Davis, Sturgeon Bay, WI (US)

(72) Inventor: Steven S. Davis, Sturgeon Bay, WI (US)

(*) Notice: Subject to any disclaimer, the term of this patent is extended or adjusted under 35 U.S.C. 154(b) by 0 days.

(21) Appl. No.: 14/181,043

(22) Filed: Feb. 14, 2014

Related U.S. Application Data

(63) Continuation-in-part of application No. 12/977,758, filed on Dec. 23, 2010, now Pat. No. 8,651,501.

(51) Int. Cl.  
*B62B 5/00* (2006.01)  
*B62B 3/02* (2006.01)

(52) U.S. Cl.  
CPC ........................................ *B62B 3/02* (2013.01)  
USPC ............... 280/47.35; 280/47.34; 280/79.11; 280/79.4; 280/62; 254/133 R; 254/134; 254/2 B; 254/7 B; 254/8 B; 269/17; 269/296; 414/430

(58) Field of Classification Search  
USPC ............... 280/47.34, 47.35, 79.11, 79.4, 62; 254/133 R, 134, 2 B, 7 B, 8 B; 269/17, 269/296; 414/430; D34/23, 31  
See application file for complete search history.

(56) References Cited

U.S. PATENT DOCUMENTS

| | | |
|---|---|---|
| 1,114,829 A | 10/1914 | Weaver |
| 1,197,998 A | 9/1916 | Beaman |
| 1,211,373 A | 1/1917 | Weaver |
| 1,559,391 A | 10/1925 | Waters |
| 1,650,810 A | 11/1927 | Wearer |
| 1,701,134 A | 2/1929 | Waite |
| 1,940,643 A | 12/1933 | Earnst |
| 2,259,279 A | 10/1941 | Watter |
| 2,335,130 A | 11/1943 | Moran |
| D139,553 S | 11/1944 | McCann |
| 2,463,744 A | 3/1949 | Clemens |
| 2,613,083 A | 10/1952 | Rudolph |
| 2,940,611 A | 6/1960 | Burch |
| 3,086,751 A | 4/1963 | Poznik |
| 3,154,200 A | 10/1964 | Versch et al. |
| 4,269,394 A | 5/1981 | Gray |
| 4,383,681 A | 5/1983 | Walters |
| 4,491,305 A | 1/1985 | Walters |
| 4,640,495 A | 2/1987 | Parsons |
| D304,118 S | 10/1989 | Snoke et al. |
| 4,934,720 A | 6/1990 | Dobron |
| 5,180,178 A | 1/1993 | Caceres |
| 5,620,192 A | 4/1997 | Demongin |

(Continued)

*Primary Examiner* — J. Allen Shriver, II  
*Assistant Examiner* — Hilary L Johns  
(74) *Attorney, Agent, or Firm* — Allen D. Hertz, P.A.; Allen D. Hertz

(57) ABSTRACT

A mobile and adjustable dolly having an adjustable "V" shaped dolly frame. The dolly frame comprises first and second pivotal frame members rotationally coupled to a central support frame member forming a "V" shape. The central support frame member comprises a series of angle maintaining features for securing each frame member at any of a plurality of angled configurations. A distal caster, having a wheel rotation disposed therewith, is assembled to a distal end of each frame member and a central caster is assembled to a pivotal region of the dolly frame. A vehicle support subassembly is disposed upon and extends upward from the each respective frame member. An elongated handle assembly extends from the central caster. The elongated handle assembly further comprises a wheel chock, which removably engages with the central wheel when subjected to the weight of the elongated handle assembly.

20 Claims, 10 Drawing Sheets

(56) References Cited

U.S. PATENT DOCUMENTS

| | | |
|---|---|---|
| 5,941,544 A | 8/1999 | Fiedler |
| 6,257,094 B1 | 7/2001 | Babich |
| 7,287,766 B2 | 10/2007 | Kilday et al. |
| 2003/0034483 A1 | 2/2003 | Anderson |
| 2003/0038439 A1 | 2/2003 | Novak et al. |
| 2003/0141686 A1 | 7/2003 | Willis |
| 2006/0192060 A1 | 8/2006 | Opsahl et al. | ously. Additionally,

THREE WHEELED AUTOMOTIVE DOLLY AND METHOD OF USE

CROSS-REFERENCE TO RELATED APPLICATION

This application is a Continuation-In-Part Patent Application claiming the benefit of U.S. Non-Provisional patent application Ser. No. 12/977,758, filed on Dec. 23, 2010 and is scheduled to issue as U.S. Pat. No. 8,651,501 on Feb. 18, 2014, which is incorporated herein in its entirety.

FIELD OF THE INVENTION

The present disclosure generally relates to an apparatus for supporting and moving automotive vehicles. More particularly, the present disclosure relates to an adjustable "V" shaped dolly that may be used to physically support and mobilize an automotive vehicle.

BACKGROUND OF THE INVENTION

In the field of automotive repair and maintenance there is often a need to raise, support, and move an immobile vehicle.

One common means for moving an immobile vehicle is by using a plurality of typical hydraulic floor jacks. Moving a vehicle with floor jacks can be difficult because all of the floor jacks need to be oriented and rolled in unison. Additionally, the small wheels on the floor jack have a high rolling resistance when under a heavy load. Another method of moving an immobile vehicle is to place wheel dollies under each wheel. Wheel dollies can cause wheel "set" if used for an extended period of time. Wheel dollies also have small wheels, which make moving the immobile vehicle difficult.

Another device for moving an immobile vehicle is to use the automobile dolly including a fixed A-shaped frame having leg members connected at their mid-section by a cross member and at an apex by a connecting plate. The device shape is bulky, which limits access to the vehicle. The "A" shaped frame design dictates the use of multiple jacks to raise the vehicle onto the dolly.

What is desired is a dolly providing a stable platform for supporting and moving an immobile vehicle. The preferred dolly maximizes access to the vehicle for servicing. The dolly should also be able to be moved easily while supporting the weight of an automotive vehicle.

SUMMARY OF THE INVENTION

The basic inventive concept provides a method for supporting and mobilizing an automotive vehicle while being worked on.

In a first aspect of the present invention, a dolly is provided for supporting and mobilizing an automotive vehicle, the dolly comprising:
  central frame support member;
  a first pivotal frame member having a first pivotal end and a distal end, the first pivotal end being pivotally attached to said central frame support plate;
  a second pivotal frame member having a second pivotal end and a distal end, the second pivotal end being pivotally attached to said central frame support plate;
  a central wheel being assembled to said central frame support plate;
  a pair of distal wheels, each wheel being assembled to said distal end of each pivotal frame member, respectively;
  a pair of vehicle support columns, each vehicle support column being assembled to a central segment of each pivotal frame member, respectively;
  wherein the first pivotal frame member and the second pivotal frame member form an adjustable "V" shape, wherein all rigid assembly connections between the first and second pivotal frame members occur proximate the central wheel.

A second aspect of the present invention is an apparatus wherein the first and second pivotal frame members are rotationally positionable such that a distance between the distal end of the first pivotal frame member and the distal end of the second pivotal frame member may be adjusted, the first and second pivotal frame members being pivotally coupled to the central frame support member at the pivotal ends thereof.

In yet another aspect, the adjustable vehicle support subassembly can be centrally positioned along a length of the respective pivotal frame member.

In yet another aspect, the vehicle support subassembly can be positioned at a distance from the distal end that is approximately one-third of the overall length of the respective pivotal frame member. It is preferred that the vehicle support subassembly is vertically adjustable.

In yet another aspect, the region formed between the first and second pivotal frame members is unobstructed such that the dolly may be positioned straddling a hydraulic floor jack between the pivotal frame members allowing the vehicle to be raised by a single hydraulic jack.

In yet another aspect, a diameter of the central and distal wheels is sufficient to roll on a hard surface, including an ability to easily roll over small cracks and imperfections or non-planar features that may occur in a ground surface, such as tile, bricks, and the like. One suggested wheel diameter is 8".

In yet another aspect, the diameter of the central and distal wheels is at least half the height of the dolly. It is preferred that the central and distal wheels all have equal diameters.

In yet another aspect of the present invention, the height of the adjustable vehicle support subassemblies is less than the diameter of the central and distal wheels.

In yet another aspect, the apparatus may be used in tandem with a second, identical dolly to support and move an automotive vehicle.

In yet another aspect, the dolly further comprises an elongated handle assembly. The elongated handle assembly is preferably removably attached to the dolly.

In yet another aspect, the removable elongated handle assembly further comprises a wheel chock, which removably engages with the central wheel. The wheel chock preferably engages under the weight of the elongated handle assembly.

In yet another aspect, the dolly can include elements for automation.

In yet another aspect, the automation can include a drive system, wherein the drive system engages with at least one wheel providing motion to the dolly.

In yet another aspect, the drive system independently engages with two wheels providing steerable motion to the dolly.

In yet another aspect, the drive system comprises an electric motor, a controller circuit, a portable power source, and a user interface (such as a switch).

In yet another aspect, the drive system can govern a speed, direction (forward, reverse), and turning of the dolly.

In yet another aspect, the automation can include a jack height adjusting system.

In yet another aspect, the jack height adjusting system can be hydraulically operated. In one embodiment, the hydraulically operated embodiment would control the height of the jack by utilizing a hydraulic cylinder assembly.

In yet another aspect, the jack height adjusting system can be electrically operated. In one embodiment, the electrically operated embodiment would control the height by utilizing a screw-drive scissor jack assembly.

In yet another aspect, the automation can include a width adjusting system.

In yet another aspect, the width adjusting system can be hydraulically operated. In one embodiment, the hydraulically operated embodiment would control the width by utilizing a hydraulic cylinder assembly.

In yet another aspect, the width adjusting system can be electrically operated. In one embodiment, the electrically operated embodiment would control the width by utilizing a screw-drive mechanism.

These and other advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

Figure 1:
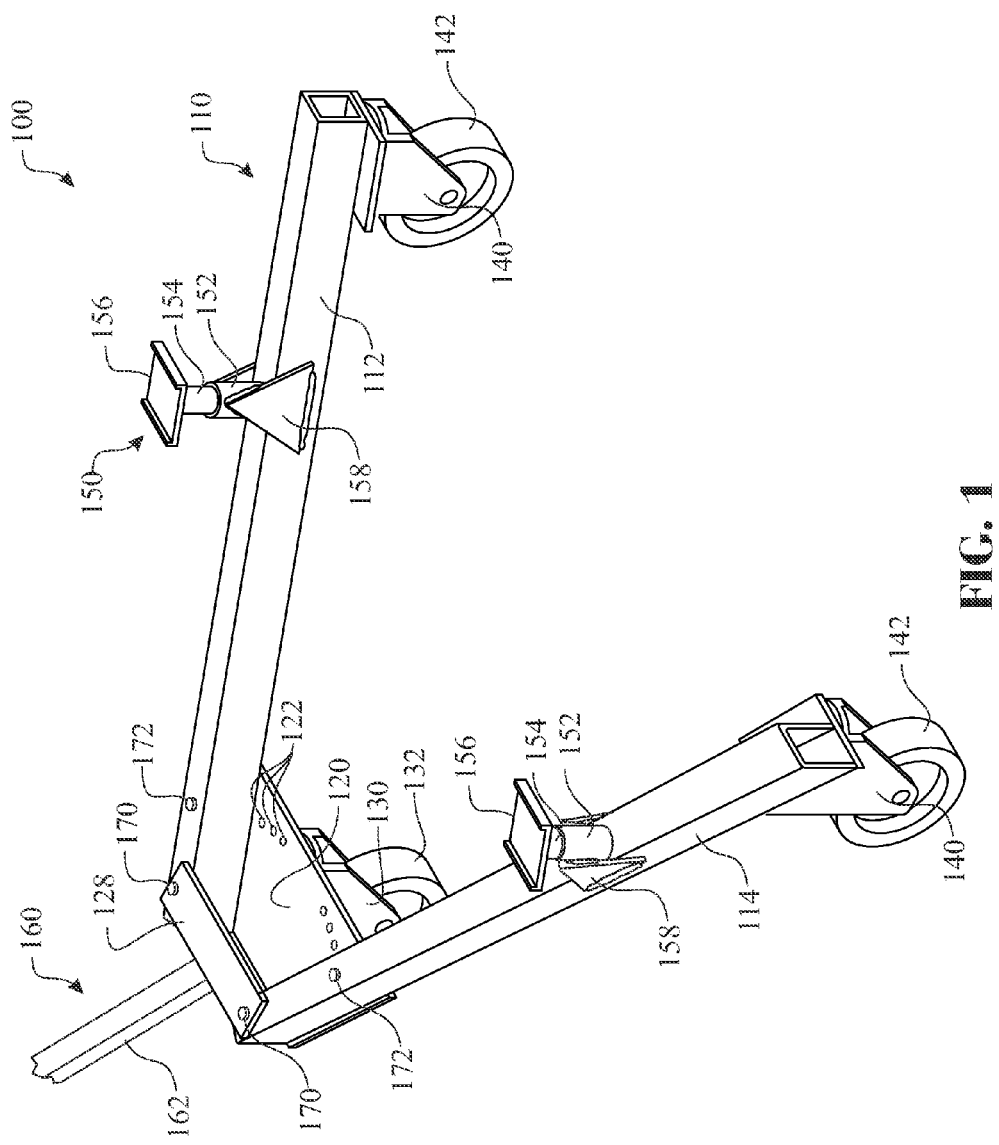
FIG. 1 presents an isometric view of an exemplary embodiment of a vehicle dolly.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
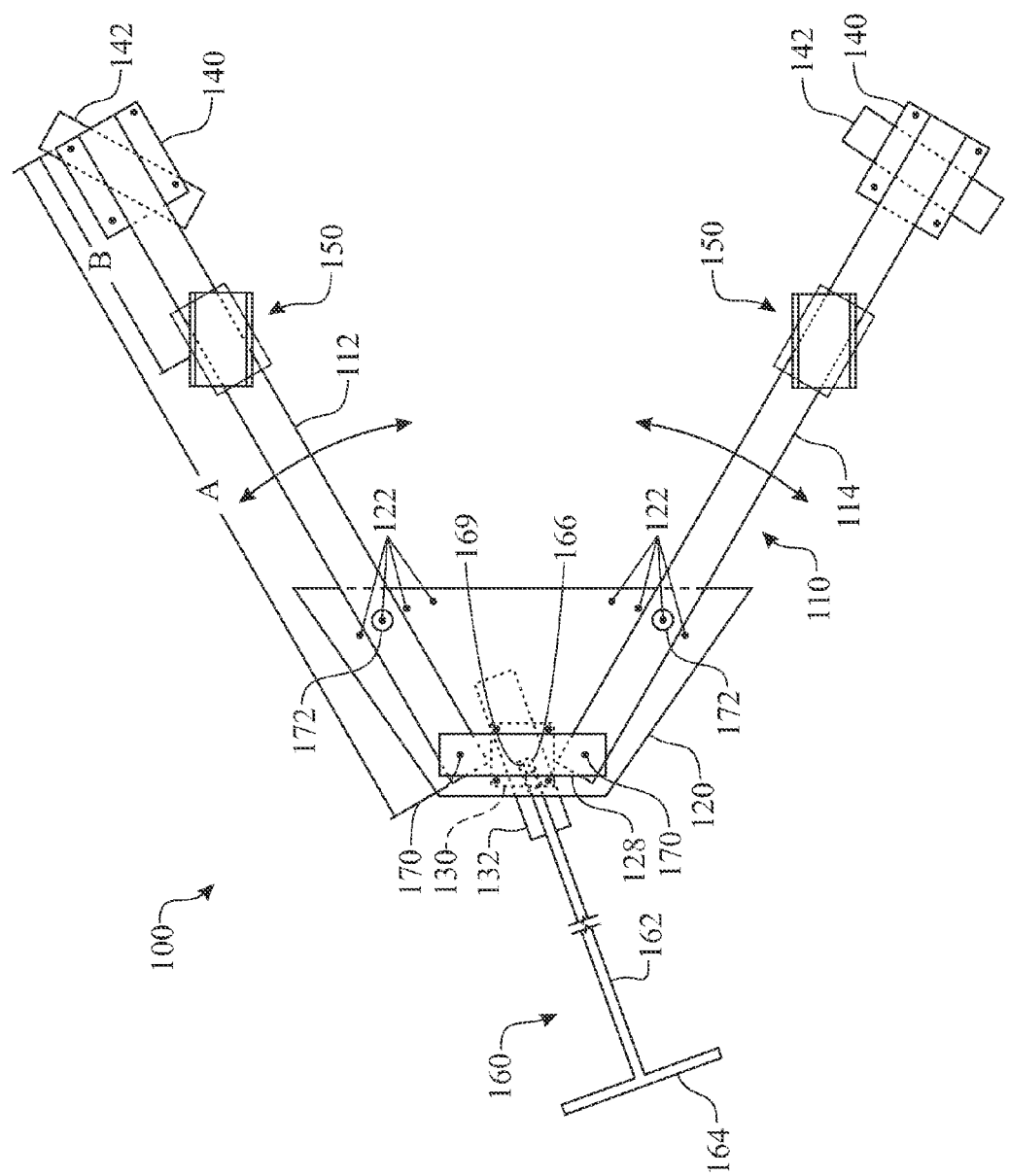
FIG. 2 presents a top plan view of the vehicle dolly originally introduced in FIG. 1.

A dolly 100 is provided to support and mobilize an automotive vehicle while being built, restored, serviced, maintained, and the like. An exemplary dolly 100 is presented in FIGS. 1 through 3. A primary component of the dolly 100 is a dolly frame 110. The dolly frame 110 includes a first pivotal frame member 112 and a second pivotal frame member 114, which are pivotally attached to a central frame support member 120. The exemplary central frame support member 120 is assembled, contacting a lower surface of the pivotal frame members 112, 114. A second central frame support member 128 can be assembled, contacting an upper surface of the pivotal frame members 112, 114 increasing the rigidity and reliability of the dolly frame 110. Alternately, the central frame support member 120 and second central frame support member 128 can be provided in a unitary structure. An arm member pivot pins 170 is used to pivotally assemble the pivotal frame members 112, 114 to the central frame support member 120 and second central frame support member 128.

The pivotal frame members 112, 114 can be fabricated of mild tubular steel, such as a 2"×3" tubular box extrusion having a ¼ inch wall thickness. It is understood that the pivotal frame members 112, 114 can be fabricated of any material, including rods, any tubular extrusion, I-beams, T-Beams, "C" channels, Angles, and the like. The pivotal frame members 112, 114 may be fabricated of any reasonable material suitable to support a predetermined maximum load. The pivotal frame members 112, 114 may additional include an arch to increase the overall strength of the dolly frame 110.

Figure 4:
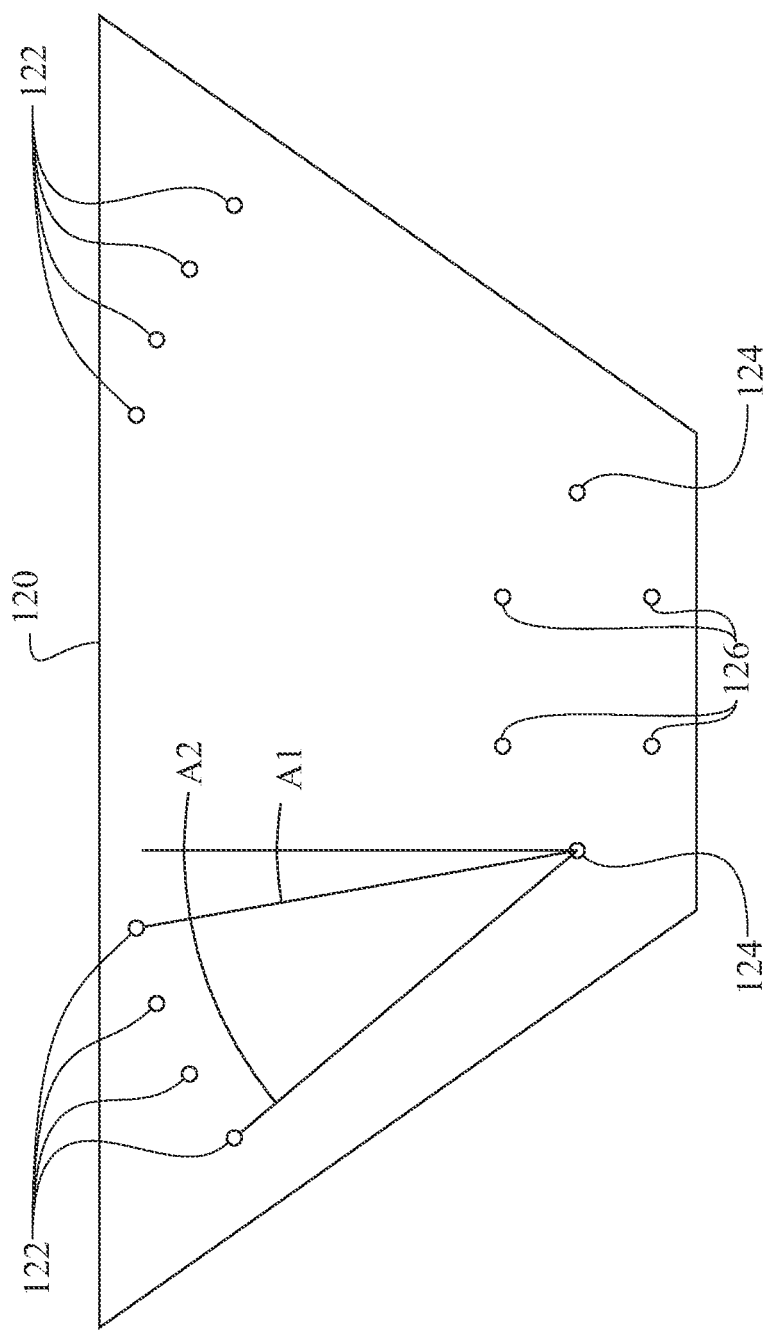
FIG. 4 presents a detailed top plan view of a central frame support member, which provides a pivotal assembly of the vehicle dolly.

The pivotal motion and angular adjustments of the pivotal frame members 112, 114 are governed by features incorporated into the central frame support member 120. Details of the central frame support member 120 are presented in FIG. 4. An arm pivot aperture 124 is provided through the central frame support member 120 for receiving the arm member pivot pins 170, thus defining the pivot location of each respective pivotal frame member 112, 114. A pair of series of angle defining apertures 122 is provided through the central frame support member 120 for locking each respective pivotal frame member 112, 114 in a predetermined angle. Each series of angle defining apertures 122 are arranged along an arc, where the arc is generated using an arm pivot aperture 124 as a radial center. The series of angle defining apertures 122 can be spatially arranged at any predetermined angle. The exemplary embodiment positioned each of the angle defining apertures 122 at 10 degree increments, having an initial angle referenced as "A1" of 10 degrees and a final angle referenced as "A2" of 40 degrees from a longitudinal reference. An angle adjustment pin 172 is removably inserted through a respective angle retention aperture (understood to be under and receive the angle adjustment pins 172) provided through each pivotal frame member 112, 114 and into the desired angle defining apertures 122. The angle retention aperture is located at a distance equal to the radial distance defined between the arm pivot aperture 124 and each angle defining apertures 122. The user rotates each respective pivotal frame member 112, 114 about the arm member pivot pins 170 into the desired angle and secures the respective pivotal frame member 112, 114 in position by inserting the angle adjustment pins 172 into the nearest angle defining apertures 122. The exemplary dolly frame 110 can be arranged having a "V" shape between 20 degrees and 80 degrees. The interior portion of the "V" provides clearance for accessing components under the vehicle, positioning tools therebetween, and the like.

It is understood that the arm pivot aperture 124 and caster mounting apertures 126 can be smooth through holes, threaded through holes, and the like. The angle defining apertures 122 can be smooth through holes, threaded through holes, blind holes, and the like. The style of each hole is respective to the designer's choice. The angle adjustment pins 172 can be retained using any commonly known retention component, including a threaded section, a cotter pin, a "C" clip, and the like.

An adjustable vehicle support subassembly 150 is attached to each of the pivotal frame members 112, 114. Each adjustable vehicle support subassembly 150 can be permanently fixed to each respective pivotal frame member 112, 114 as illustrated or be slideably adjusting along a length of the respective pivotal frame members 112, 114. The adjustable vehicle support subassembly 150 is fabricated having a vehicle support column 152 for receiving a vehicle support adjustment column 154. The vehicle support column 152 extends upright from the respective pivotal frame member 112, 114. In a fixed configuration, a vehicle support attachment gusset 158 can be utilized to attach and support the vehicle support column 152 in the proper orientation using any reasonable mechanical attachment means. In a slideably configuration, any known slideable interface can be provided between the vehicle support column 152 and the respective pivotal frame member 112, 114. A vehicle support plate 156 is provided upon an upper end of the vehicle support adjustment column 154 for distributing a supported load across a contacting surface. In the exemplary embodiment, the vehicle support adjustment column 154 slides into the vehicle support column 152, creating a vertically adjustable interface. A locking pin or other locking device can be deployed to vertically position the vehicle support plate 156. Additionally, a round cross sectional shape allows the user to rotate the vehicle support plate 156 into the desired orientation. It is understood that other symmetric cross sectional shapes allow the user to angularly position the vehicle support plate 156 respective to the specific shape provided.

A plurality of wheels 132, 142 can be assembled to the dolly frame 110 to provided mobility to the dolly 100. The wheels can be rotationally attached to the dolly frame 110 by a caster 130, 140. An exemplary vertex caster 130 is attached to the central frame support member 120 by inserting threaded fasteners through a plurality of caster mounting apertures 126 and a similarly patterned series of apertures provided through the vertex caster 130. The vertex caster 130 provides directional rotation of the central wheel 132, rotating about a vertical axis. The central wheel 132 is rotationally assembled to the vertex caster 130, rotation about a horizontal axis. A pair of distal casters 140 is assembled to the dolly frame 110, where each distal caster 140 is assembled to a distal end of the respective pivotal frame member 112, 114. The distal wheel 142 is assembled to the distal caster 140 in a manner similar to the assembly of the central wheel 132 to the vertex caster 130. The three wheels 132, 142 extend downward from the dolly frame 110 creating a mobile planar support surface. The casters 130, 140 can be of any swivel design. They can be assembled to the dolly frame 110 by any mechanical assembly interface, including mechanical fasteners, welding, and the like. The casters 130, 140 can include swivel locks, wheel locks, and any other feature commonly associated with a caster. The wheels 132, 142 may be of any form factor, including low deflection tires, pneumatic tires, steel tires, plastic tires, and the like, while taking a load rating into consideration.

Figure 5:
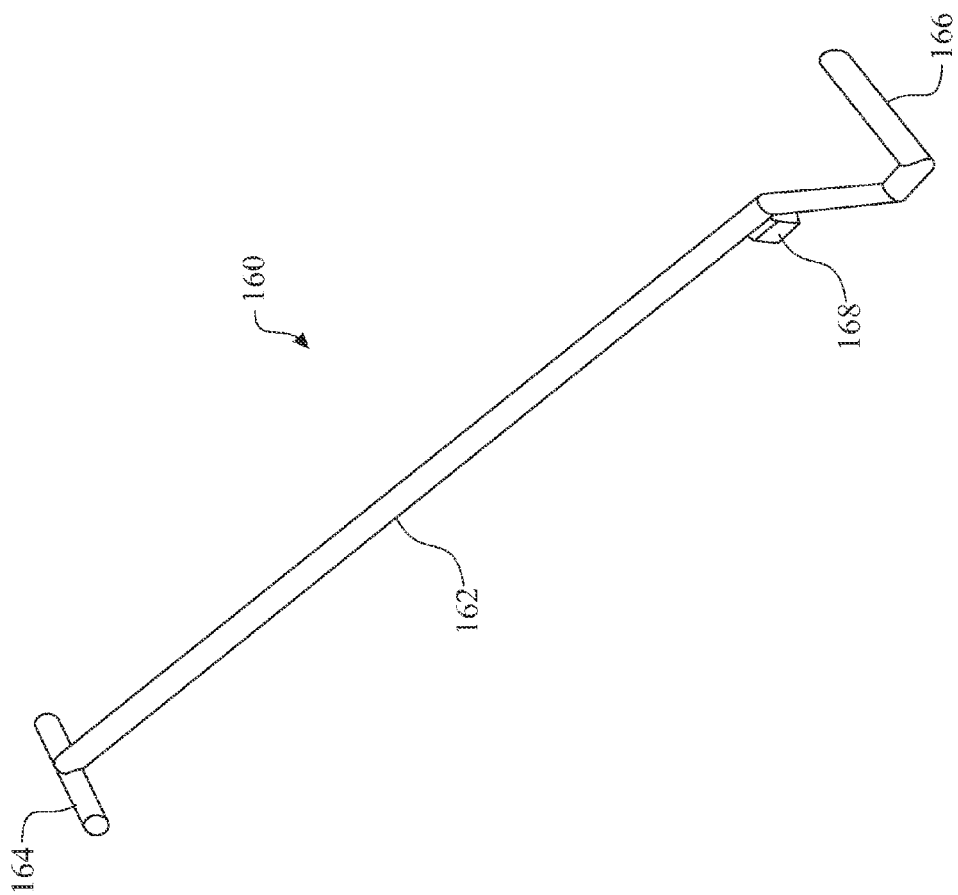
FIG. 5 presents an isometric view of an exemplary elongated handle assembly.

An elongated handle assembly 160 can be removably and/or pivotally attached to the dolly frame 110 using any reasonable interface configuration. One exemplary elongated handle assembly 160 is illustrated in FIG. 5. The elongated handle assembly 160 is fabricated having a handle grip member 164 perpendicularly attached to a grip end of a elongated handle member 162 and a dolly engagement member 166 provided at an attachment end of the elongated handle member 162. The handle grip member 164 is fabricated of a shape, size, and material that is conducive to the assembly process and comfortable for the user. The dolly engagement member 166 can include a section of material to offset the attachment end of the elongated handle member 162, allowing the central longitudinal axis of the elongated handle member 162 to align with a midpoint of the dolly engagement member 166. The elongated handle assembly 160 is preferably fabricated of round tubular stock. Each section being cut to the desired length and the components are then welded together. A wheel chock 168 can be attached extending downward from the attachment end of the elongated handle member 162. The dolly engagement member 166 is slipped into a handle receiving member 169. The handle receiving member 169 is preferably attached to the vertex caster 130, wherein when the user rotates the elongated handle assembly 160; the user is also redirecting the rotation of the central wheel 132. The unsupported weight of the elongated handle assembly 160 lowers the wheel chock 168, causing the wheel chock 168 to rest against the central wheel 132 and creating a wheel-braking interface.

The dolly 100 has been reduced to practice, using the following exemplary dimensions. A length of each pivotal frame member 112, 114 (referenced as "A" in FIG. 2) is 36 inches. An overall height of the dolly 100 is 17½ inches (referred to as "C" in FIG. 3). Each adjustable vehicle support subassembly 150 is located at a distance from the distal end that is ⅓ of the overall length of the pivotal frame member 112, 114 (referred to as "B" in FIG. 2). A distance between each of the arm pivot aperture 124, providing the rotational points for each pivotal frame member 112, 114 is preferably 8 inches. It is understood the pivot location 124 for each of the pivotal frame members 112, 114 can be separated as illustrated or overlapping, using the same rotational axle location. The vehicle support plate 156 can be any reasonable size with the exemplary embodiment being a 5 inch square having one pair of parallel edges bent upwards. The exemplary elongated handle assembly 160 was fabricated having a length of 48 inches.

Figure 3:
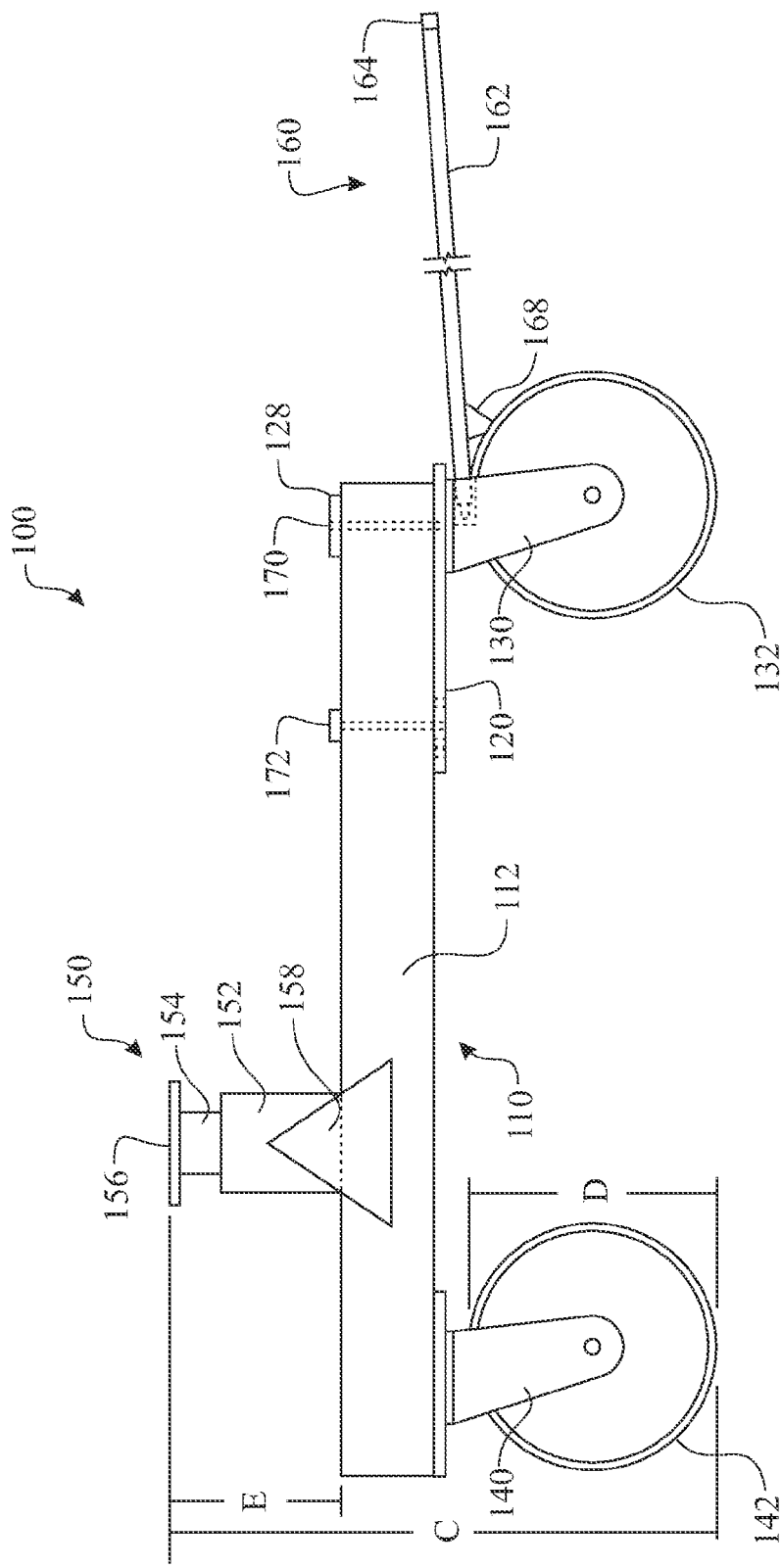
FIG. 3 presents a side elevation view of the vehicle dolly originally introduced in FIG. 1.

The wheels 132, 142 can be provided having a diameter (referenced as "D" in FIG. 3) that is at least equal to a height of the adjustable vehicle support subassembly 150, or more specifically, a distance between a top surface of the pivotal frame member 112, 114 and the top surface of the vehicle support plate 156 (referenced as "E" in FIG. 3). It is desirable to provide a caster 130, 140 and wheel 132, 142 combination (and any spacers as required) to provide a vertical clearance (referenced as "F" in FIG. 3) between the ground surface 350 and an underside surface of the pivotal frame member 112, 114 that allows a hydraulic floor jack 200 to pass thereunder. In the exemplary embodiment, the clearance is 9¾ inches.

Figure 6:
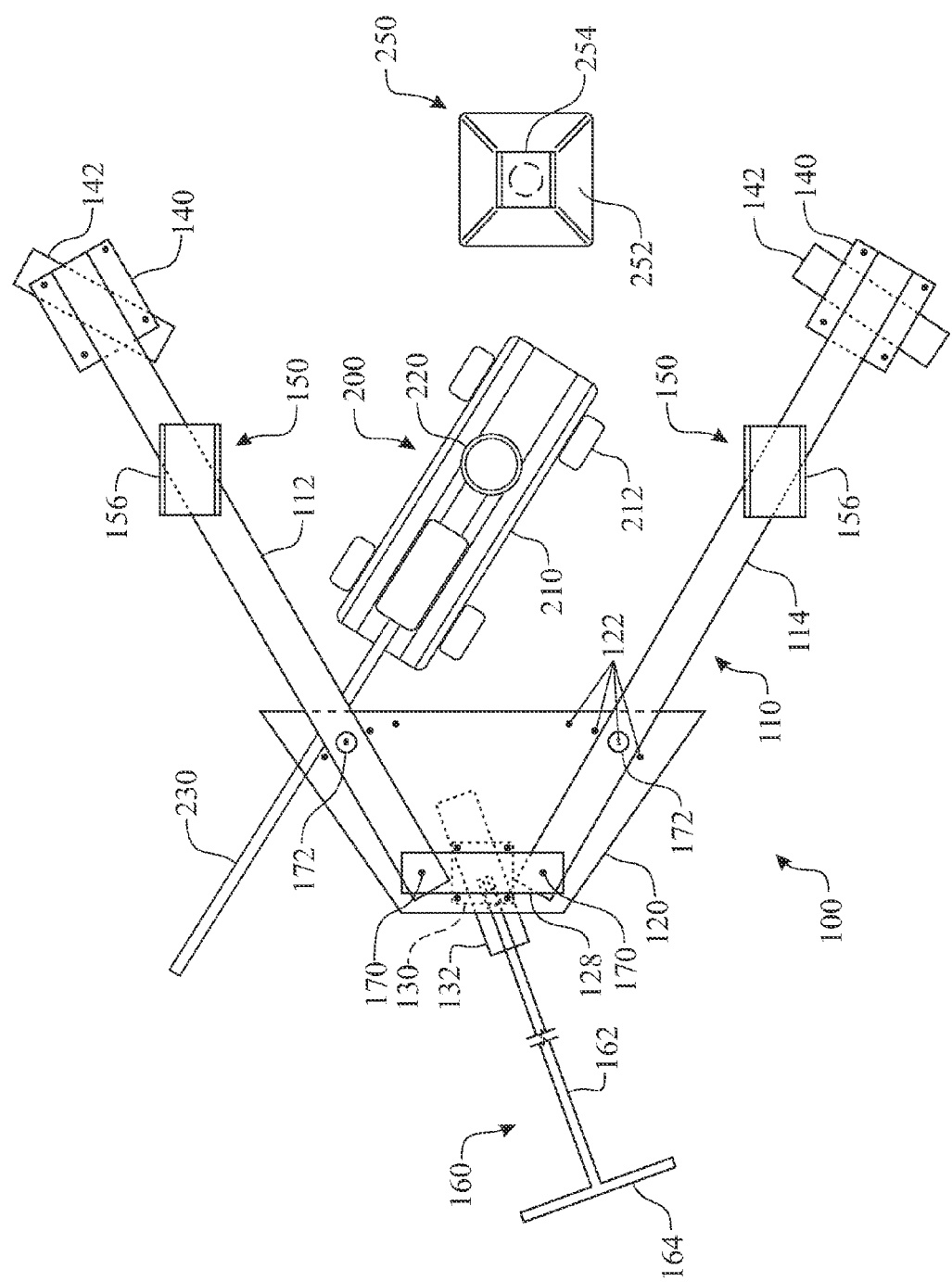
FIG. 6 presents a top view of the vehicle dolly used in combination with a hydraulic floor jack.
Figure 7:
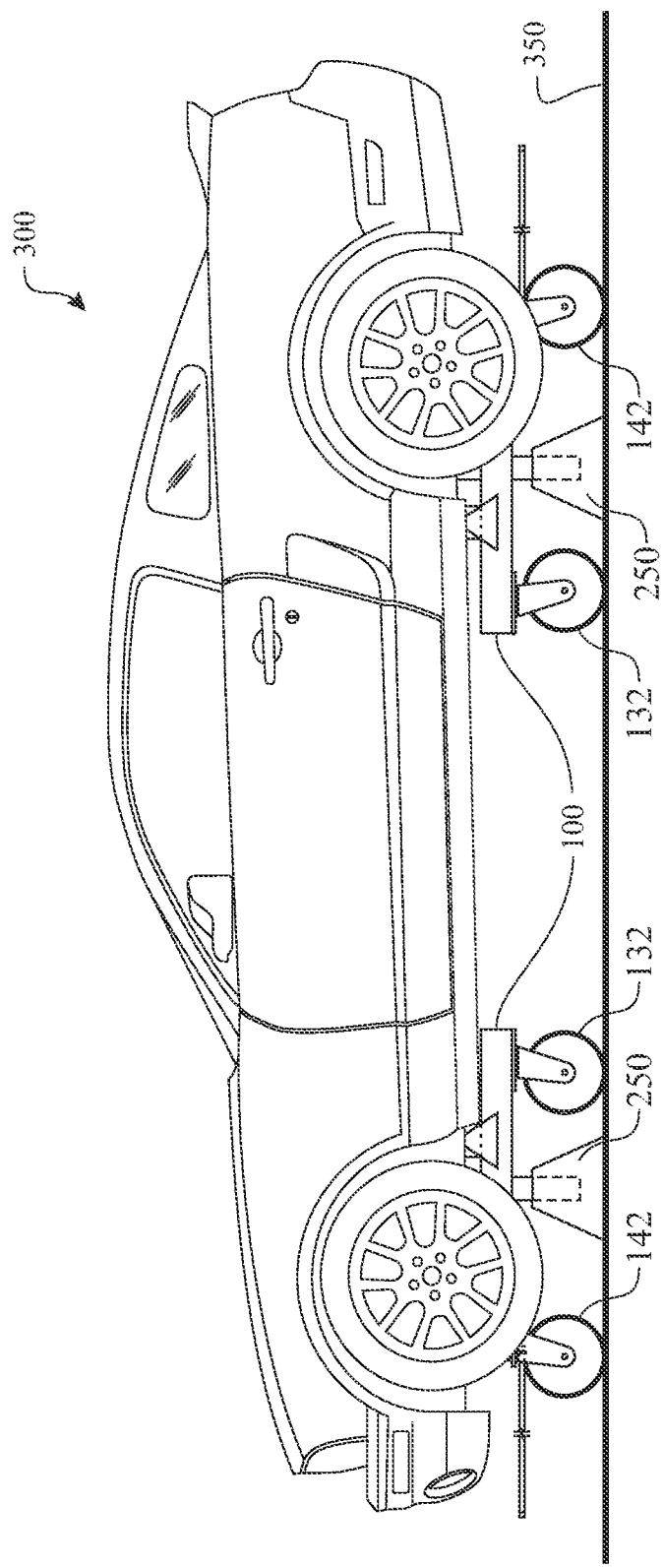
FIG. 7 presents a side elevation view illustrating an exemplary application of a pair of vehicle dollies supporting a vehicle.

An exemplary application of the dolly 100 is presented in FIGS. 6 and 7. The vehicle technician or enthusiast would configured the dolly 100 by determining a desired span between each of the adjustable vehicle support subassemblies 150 which would position each of the vehicle support plate 156 respective to a sufficient vehicle support member. The user would then pivot the pivotal frame members 112, 114 about the arm member pivot pins 170 to the desired angle. The user locks the pivotal frame members 112, 114 into position by inserting the 172 through the pivotal frame member 112, 114 and into the respective angle defining apertures 122. The technician obtains a hydraulic floor jack 200 for lifting the automotive vehicle 300. The hydraulic floor jack 200 includes a hydraulic jack support plate 220 operatively controlled within a hydraulic jack body 210. A plurality of hydraulic jack wheels 212 is rotationally attached to the hydraulic jack body 210, providing mobility to the hydraulic floor jack 200. A hydraulic jack handle 230 is attached to the hydraulic jack body 210, providing vertical control as well as a means for directing any rolling motion of the hydraulic floor jack 200. The technician raises the vehicle to the minimum required height by centrally positioning the hydraulic floor jack 200 (FIG. 6) underneath a automotive vehicle 300 (FIG. 7) aligning the hydraulic jack support plate 220 with a sufficient vehicle support member. The technician raises the automotive vehicle 300 to a height above the ground surface 350 that is greater than the height of the dolly 100, allowing the dolly 100 to be freely positioned under the vehicle. The "V" shape of the dolly frame 110 allows the technician to position the dolly 100 to straddle the hydraulic floor jack 200 as illustrated. The dolly 100 is positioned, aligning each of the vehicle support plate 156 with a desired support feature of the automotive vehicle 300. During the positioning of the dolly 100, the hydraulic jack handle 230 is routed under the respective frame member 112, 114. The clearance between the ground surface 350 and a bottom surface of the frame member 112, 114 is greater than an overall height of the hydraulic floor jack 200. This allows the technician to roll the hydraulic floor jack 200 under the dolly frame 110. The technician slowly lowers the hydraulic jack support plate 220, resting the automotive vehicle 300 onto the vehicle support plate 156. Once the hydraulic floor jack 200 is lowered and no longer supporting the automotive vehicle 300, the technician can remove the hydraulic floor jack 200 from the working area. The process can be repeated, utilizing a second dolly 100 to support an opposite end of the automotive vehicle 300 as illustrated in FIG. 7.

The open "V" shape formed between the first pivotal frame member 112 and the second pivotal frame member 114 enables the user to locate the dolly 100 about any object extending upward from the ground surface 350. In one example, the dolly 100 can be routed around the hydraulic jack support plate 220 of the hydraulic floor jack 200 when the hydraulic jack support plate 220 is raised. In a second example, the dolly 100 can be routed around a jack stand 250. Each jack stand 250 includes a jack stand support column 254 which is vertically adjustable and supported by a jack stand base 252. The jack stand 250 is commonly placed upon the ground surface 350 and is vertically adjusted (as shown in FIG. 7), placing an upper surface of a jack stand support column 254 against a lower surface of an element (such as a frame member) of the automotive vehicle 300. The ability to slide the hydraulic floor jack 200 under each of the pivotal frame members 112, 114 and the ability to wheel the dolly 100 around any object that is either supported by the ground surface 350 or hanging down from the automotive vehicle 300 that would normally interfere with a standard dolly. The adjustable angle between the first pivotal frame member 112 and the second pivotal frame member 114 enables custom positioning of the vehicle support plate 156 to align with specific contact points on the automotive vehicle 300 or any other object that is to be supported.

When work on the automotive vehicle 300 is completed, the process is reversed to remove each of the dollies 100 from supporting the automotive vehicle 300. The elongated handle assembly 160 can be removed and each of the pivotal frame member 112, 114 can be rotated into a parallel configuration for compact storage.

The dolly 100 can be automated by integrated either electrically operated automation, hydraulically operated automation, or any other suitable automation system, or any combination thereof. The automation can be directed towards lateral movement or rolling, vertical positioning of the jack stands, and for adjusting the angle between the pivotal frame members 112, 114.

Figure 8:
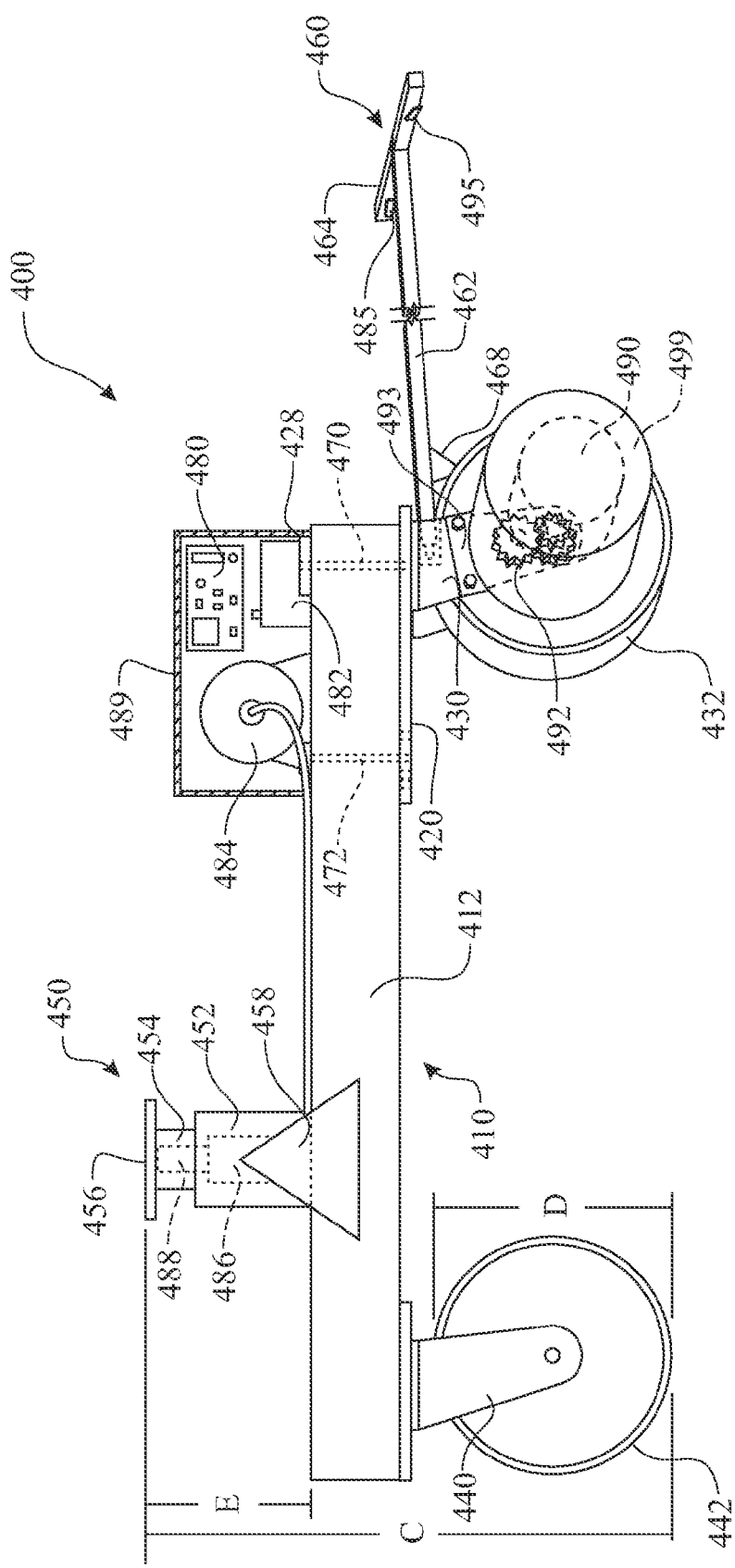
FIG. 8 presents a side elevation view of an exemplary automated vehicle dolly comprising at least one drive wheel and a hydraulically operated jack stand.
Figure 9:
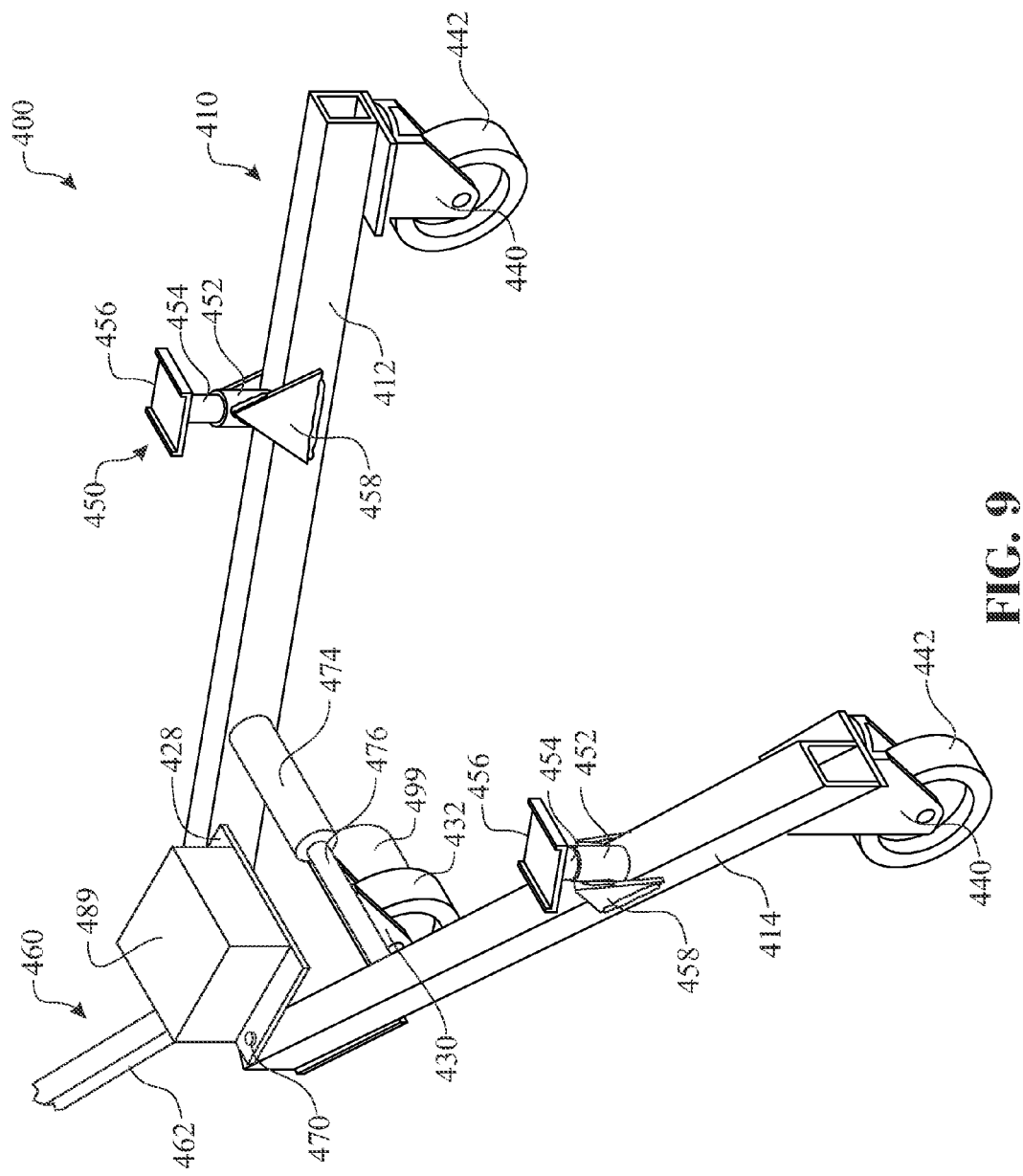
FIG. 9 presents an isometric top elevation view of the exemplary automated vehicle dolly introduced in FIG. 8, wherein the illustration introduces a width adjusting mechanism.

An exemplary dolly 400 is presented in FIGS. 8 and 9, wherein the dolly 400 introduces an electric movement drive system and a hydraulic jack positioning system. The dolly 400 and the dolly 100 include a significant number of like elements. Like features of the dolly 400 and the dolly 100 are numbered the same except preceded by the numeral '4'. The exemplary electric movement drive system integrates a wheel drive motor 490 with the central wheel 432. The exemplary embodiment includes a reduction gear assembly 492 operationally assembled between a drive gear of the wheel drive motor 490 and a similar drive gear engaged with the central wheel 432. The wheel drive motor 490 is mounted within a wheel drive mounted enclosure 499. The wheel drive mounted enclosure 499 is assembled to a vertex caster 430 using a motor assembly mounting bracket 493 and a series of mechanical fasteners. Although the exemplary embodiment employs the reduction gear assembly 492, it is understood that any suitable drive interface can be integrated between the wheel drive motor 490 and the central wheel 432. The wheel drive motor 490 can drive a friction wheel, wherein the friction wheel engages with a contacting surface of the central wheel 432. Although the exemplary embodiment integrates an electrical drive system with the central wheel 432, it is understood that the wheel drive motor 490 can be integrated into any of the wheels 432, 442. It is also understood that the electrical drive system can include a wheel drive motor 490 attached to two (2) wheels 432, 442, enabling automated steering by rotating each of the wheels 432, 442 at different speeds.

Power is supplied to the dolly 400 by a portable power unit 482. Control of the automated functions is provided by a controller circuitry 480. One or more hand controls are integrated into or assembled onto a handle grip member 464, providing ease of operation to the user. In use, the operator would position a drive controller switch 495 to send a signal to the controller circuitry 480. The motion of the drive controller switch 495 can direct a forward motion signal, a rearward motion signal, and an associated speed for each. When the dolly 400 includes a plurality of motors, the drive controller switch 495 can include features enabling the user to steer or direct the dolly 400 to turn. The drive controller switch 495 is in signal communication with the controller circuitry 480 by way of wired and/or wireless communication. This can be accomplished by integrated multiple triggers into the handle grip member 464, by employing a multidirectional switch enabling directions for each motor independently of the other motor.

Each vehicle support plate 456 of each respective adjustable vehicle support subassembly 450 can be vertically positioned by an automated vertical positioning system. The exemplary automated vertical positioning system utilizes a hydraulic positioning system. The exemplary hydraulic positioning system includes a hydraulic pump 484 in operational control with the controller circuitry 480. The hydraulic pump 484 is integrated in fluid communication with a hydraulic cylinder 486 by one or more fluid conduits. Injection and retraction of a volume of non-compressible fluid into the hydraulic cylinder 486 vertically positions a hydraulic piston arm 488. Injection of fluid drives the hydraulic piston arm 488 upward. Retraction of fluid draws the hydraulic piston arm 488 downward. The hydraulic positioning system can include a jack controller switch 485, providing a control mechanism to the user. The jack controller switch 485 is in signal communication with the controller circuitry 480 by way of wired and/or wireless communication. The jack controller switch 485 would provide an instruction signal to the controller circuitry 480, which in turn operates the hydraulic pump 484 to transfer fluid to or from the hydraulic cylinder 486.

The dolly 400 can optionally include an automated width or angular adjusting system as illustrated in FIG. 9. The first pivotal frame member 412 and second pivotal frame member 414 are pivotally integrated into the dolly 400. The angular adjusting system changes an angle defined between each of the first pivotal frame member 412 and second pivotal frame member 414. The angular adjusting system can utilize be any suitable system in conjunction with a pivot assembly. The exemplary angular adjusting system utilizes a hydraulic piston comprising a automated angle adjusting piston 476 slideably assembled to a automated angle adjusting cylinder 474. The automated angle adjusting cylinder 474 is in fluid communication with the hydraulic pump 484. In the exemplary embodiment, the hydraulic pump 484 provides dual functionality: hydraulic control of the adjustable vehicle support subassemblies 450 and providing hydraulic flow to and from the automated angle adjusting cylinder 474. As a volume of fluid increases within the hydraulic pump 484, the volume of fluid drives the hydraulic cylinder 486 outward. As a volume of fluid decreases within the hydraulic pump 484, the reduction of the volume of fluid draws the hydraulic cylinder 486 inward.

Figure 10:
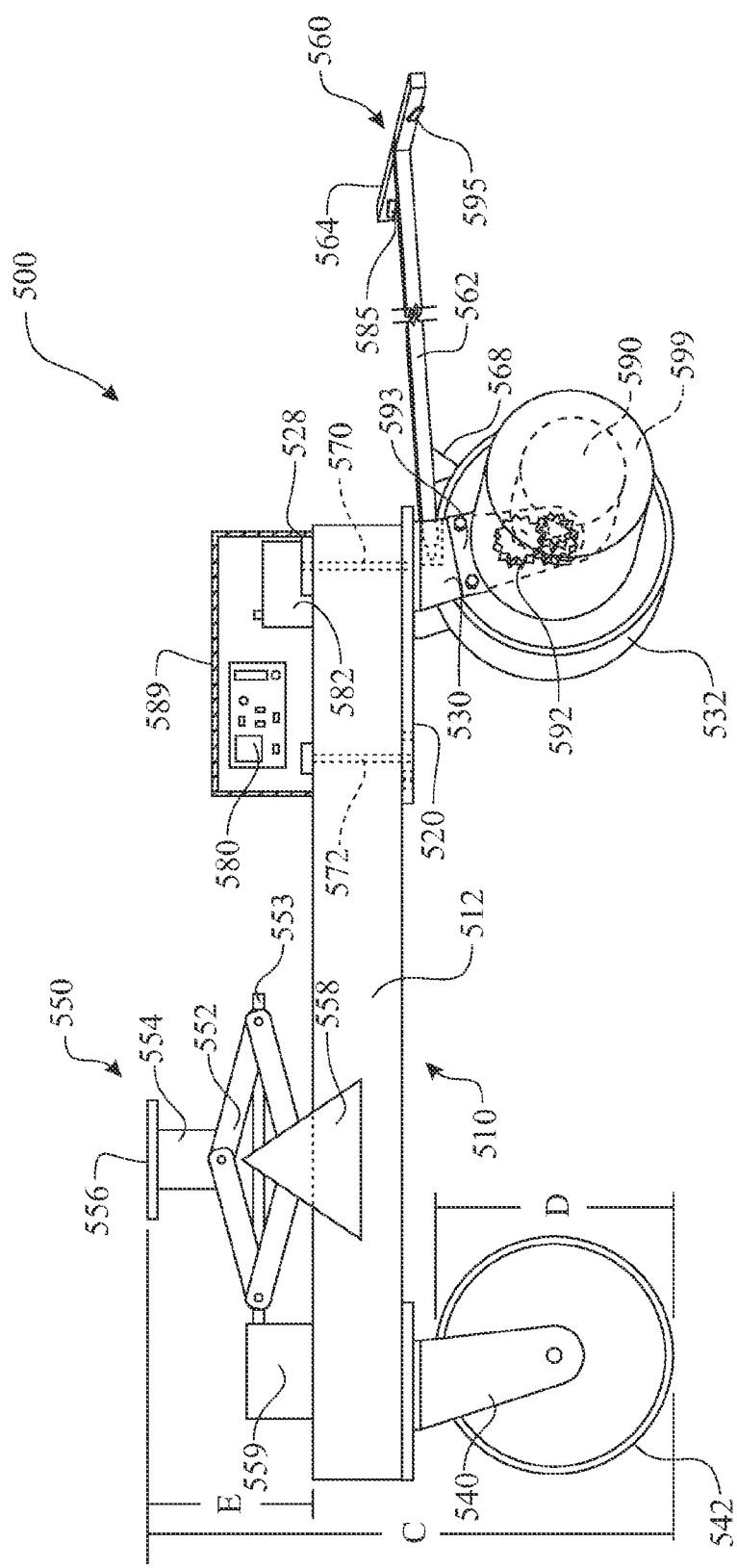
FIG. 10 presents a side elevation view of a second exemplary automated vehicle dolly comprising at least one drive wheel and an electrically operated jack stand.

An exemplary dolly 500 is presented in FIG. 10, wherein the dolly 500 introduces an electrically operated jack positioning system. The dolly 500 and the dolly 400 include a significant number of like elements. Like features of the dolly 500 and the dolly 100 are numbered the same except preceded by the numeral '5'. The dolly 500 includes an electrically operated adjustable vehicle support subassembly 550. The exemplary adjustable vehicle support subassembly 550 is provided in a form of a scissor jack. The lifting portion of the adjustable vehicle support subassembly 550 is provided by a scissor jack frame 552. The scissor jack frame 552 is operated by a threaded drive element 553. In one rotational direction, the threaded drive element 553 draws the ends of the scissor jack frame 552 towards one another driving the vehicle support adjustment column 554 and vehicle support plate 556 upwards and in another, opposite rotational direction, the threaded drive element 553 driving the ends of the scissor jack frame 552 apart drawing the vehicle support adjustment column 554 and vehicle support plate 556 downwards. Operational control of the automated jack control system can be provided by the controller circuitry 580. Input is provide to the controller circuitry 580 through a jack controller switch 585. The jack controller switch 585 can be any suitable user interface. One preferred jack controller switch 585 would enable bidirectional variable control enabling the user to raise or lower the adjustable vehicle support subassembly 550. The variable engagement of the jack controller switch 585 enables the user to vary the speed of the movement of the adjustable vehicle support subassembly 550.

Although the exemplary embodiment employs a scissor jack configuration, it is understood that any suitable electrically operated lifting configuration can be integrated into the dolly 500.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What I claim is:

1. A method of utilizing a mobile and adjustable dolly for moveably supporting an object, the comprising steps of:
   obtaining a mobile and adjustable dolly, the mobile and adjustable dolly comprising:
      a central frame support member, a first pivotal frame member having a first pivotal end and a first free end, and a second pivotal frame member having a second pivotal end and a second free end, wherein a pivotal end of the first pivotal frame member is pivotally joined to the central frame support member and a pivotal end of the second pivotal frame member is pivotally joined to the central frame support member, the central frame support member, first pivotal frame member and second pivotal frame member collectively forming an open "V" shape,
      a pair of vehicle support columns, each vehicle support column being assembled to a central segment of each pivotal frame member,
      a central wheel rotationally attached to the central frame support member enabling rotation about a generally vertical axis,
      one distal wheel attached to the free end of the first pivotal frame member,
      a second distal wheel attached to the free end of the second pivotal frame member,
      wherein the central wheel, the first distal wheel, and the second distal wheel define a supporting plane under the mobile and adjustable dolly,
      wherein said open "V" shape enables positioning of said mobile and adjustable dolly about at least one of an element extending upward from a ground and an element extending downward from said object;
   rolling said mobile and adjustable dolly into a position underneath an object;
   adjusting said angle defined between longitudinal axis of each of said first pivotal frame member and said second pivotal frame member to position each of said pair of vehicle support columns in registration with target support location of said object;
   affixing said first pivotal frame member and said second pivotal frame member at said angle;
   engaging each upper surface of each of said pair of vehicle support columns against said target support location of said object in a manner to support said object by said mobile and adjustable dolly; and
   supporting said object upon said mobile and adjustable dolly.

2. A method of utilizing a mobile and adjustable dolly for moveably supporting an object as recited in claim 1, the method further comprising a step of:
   temporarily mechanically securing each of said first pivotal frame member and said second pivotal frame member to said central frame support member to affix said first pivotal frame member and said second pivotal frame member at said angle.

3. A method of utilizing a mobile and adjustable dolly for moveably supporting an object as recited in claim 1, the method further comprising a step of:
   temporarily mechanically securing said first pivotal frame member to said central frame support member by inserting a first angle adjustment pin through an aperture passing through said first pivotal frame member and into one of a series of angle defining apertures passing through said central frame support member; and
   temporarily mechanically securing said second pivotal frame member to said central frame support member by inserting a second angle adjustment pin through an aperture passing through said second pivotal frame member and into another of a series of angle defining apertures passing through said central frame support member; thus affixing said first pivotal frame member and said second pivotal frame member at said angle.

4. A method of utilizing a mobile and adjustable dolly for moveably supporting an object as recited in claim 1, the method further comprising a step of:
   rolling said mobile and adjustable dolly into a desired position underneath said object.

5. A method of utilizing a mobile and adjustable dolly for moveably supporting an object as recited in claim 1, the method further comprising steps of:
identifying a vertically obstructing object located in a vicinity of a desired support position of said mobile and adjustable dolly, wherein said vertically obstructing object is defined as having at least one of:
a vertically obstructing object structure extending upward from a ground to a height above said ground that is greater than a distance between said ground and a lower surface of said first and second pivotal frame members and an object, and
a vertically obstructing object structure extending downward from said object to a height above said ground that is less than a distance between said ground and a lower surface of said first and second pivotal frame members and an object;
rolling said mobile and adjustable dolly in a direction passing each of said free ends of said first and said second pivotal frame members by respective sides of a vertical obstructing element,
locating said vertically obstructing element within an area defined by said "V" shape formed between said first pivotal frame member and said second pivotal frame member, and
rolling said mobile and adjustable dolly into a desired position underneath said object.

6. A method of utilizing a mobile and adjustable dolly for moveably supporting an object as recited in claim 1, said mobile and adjustable dolly further comprising a elongated handle assembly in operational engagement with said central wheel, the method further comprising a step of:
steering said mobile and adjustable dolly by rotating said elongated handle assembly about a generally vertical axis, wherein said rotating motion of said elongated handle assembly rotates said central wheel accordingly.

7. A method of utilizing a mobile and adjustable dolly for moveably supporting an object as recited in claim 1, the method further comprising a step of:
rolling a hydraulic floor jack under one of said first pivotal frame member and said second pivotal frame member.

8. A method of utilizing a mobile and adjustable dolly for moveably supporting an object as recited in claim 1, the mobile and adjustable dolly further comprising an electric wheel drive system in operational engagement with at least one of said central wheel, the first distal wheel, and the second distal wheel, the method further comprising a step of:
operating said electric wheel drive system causing rotation of said engaged at least one of said central wheel, the first distal wheel, and the second distal wheel.

9. A method of utilizing a mobile and adjustable dolly for moveably supporting an object as recited in claim 8, the mobile and adjustable dolly further comprising an automated pivotal support member angle adjustment system comprising an automated pivotal support member angle adjusting element which angularly positions said first pivotal support member and said second pivotal support member with one another,
wherein said step of adjusting said angle defined between longitudinal axis of each of said first pivotal frame member and said second pivotal frame member to position each of said pair of vehicle support columns in registration with target support location of said object is accomplished by operating said automated pivotal support member angle adjustment system.

10. A method of utilizing a mobile and adjustable dolly for moveably supporting an object, the comprising steps of:
obtaining a mobile and adjustable dolly, the mobile and adjustable dolly comprising:
a central frame support member, a first pivotal frame member having a first pivotal end and a first free end, and a second pivotal frame member having a second pivotal end and a second free end, wherein a pivotal end of the first pivotal frame member is pivotally joined to the central frame support member and a pivotal end of the second pivotal frame member is pivotally joined to the central frame support member, the central frame support member, first pivotal frame member and second pivotal frame member collectively forming an open "V" shape,
a pair of vehicle support columns, each vehicle support column comprising a vertically adjustable element, wherein said vertically adjustable element vertically positions an object support element, each of said pair of vehicle support columns being assembled to a central segment each of said first pivotal frame member and second pivotal frame member, respectively,
a central wheel rotationally attached to the central frame support member enabling rotation about a generally vertical axis,
one distal wheel attached to the free end of the first pivotal frame member,
a second distal wheel attached to the free end of the second pivotal frame member,
wherein the central wheel, the first distal wheel, and the second distal wheel define a supporting plane under the mobile and adjustable dolly,
wherein said open "V" shape enables positioning of said mobile and adjustable dolly about at least one of an element extending upward from a ground and an element extending downward from said object;
rolling said mobile and adjustable dolly into a position underneath an object;
adjusting said angle defined between longitudinal axis of each of said first pivotal frame member and said second pivotal frame member to position each of said pair of vehicle support columns in registration with target support location of said object;
affixing said first pivotal frame member and said second pivotal frame member at said angle;
vertically positioning said vertically adjustable element, positioning said object support element at a desired height for engaging and supporting said target support location of said object;
engaging each upper surface of each of said pair of vehicle support columns against said target support location of said object in a manner to support said object by said mobile and adjustable dolly; and
supporting said object upon said mobile and adjustable dolly.

11. A method of utilizing a mobile and adjustable dolly for moveably supporting an object as recited in claim 10, the method further comprising a step of:
temporarily mechanically securing each of said first pivotal frame member and said second pivotal frame member to said central frame support member to affix said first pivotal frame member and said second pivotal frame member at said angle.

12. A method of utilizing a mobile and adjustable dolly for moveably supporting an object as recited in claim 10, the method further comprising a step of:
temporarily mechanically securing said first pivotal frame member to said central frame support member by inserting a first angle adjustment pin through an aperture passing through said first pivotal frame member and into one of a series of angle defining apertures passing through said central frame support member; and
temporarily mechanically securing said second pivotal frame member to said central frame support member by inserting a second angle adjustment pin through an aperture passing through said second pivotal frame member and into another of a series of angle defining apertures passing through said central frame support member;

thus affixing said first pivotal frame member and said second pivotal frame member at said angle.

13. A method of utilizing a mobile and adjustable dolly for moveably supporting an object as recited in claim 10, the method further comprising a step of:

rolling said mobile and adjustable dolly into a desired position underneath said object.

14. A method of utilizing a mobile and adjustable dolly for moveably supporting an object as recited in claim 10, the method further comprising steps of:

identifying a vertically obstructing object located in a vicinity of a desired support position of said mobile and adjustable dolly, wherein said vertically obstructing object is defined as having at least one of:

a vertically obstructing object structure extending upward from a ground to a height above said ground that is greater than a distance between said ground and a lower surface of said first and second pivotal frame members and an object, and a vertically obstructing object structure extending downward from said object to a height above said ground that is less than a distance between said ground and a lower surface of said first and second pivotal frame members and an object;

rolling said mobile and adjustable dolly in a direction passing each of said free ends of said first and said second pivotal frame members by respective sides of a vertical obstructing element, locating said vertically obstructing element within an area defined by said "V" shape formed between said first pivotal frame member and said second pivotal frame member, and rolling said mobile and adjustable dolly into a desired position underneath said object.

15. A method of utilizing a mobile and adjustable dolly for moveably supporting an object as recited in claim 10, said mobile and adjustable dolly further comprising a elongated handle assembly in operational engagement with said central wheel, the method further comprising a step of:

steering said mobile and adjustable dolly by rotating said elongated handle assembly about a generally vertical axis, wherein said rotating motion of said elongated handle assembly rotates said central wheel accordingly.

16. A method of utilizing a mobile and adjustable dolly for moveably supporting an object as recited in claim 10, the method further comprising a step of:

rolling a hydraulic floor jack under one of said first pivotal frame member and said second pivotal frame member.

17. A method of utilizing a mobile and adjustable dolly for moveably supporting an object as recited in claim 10, the mobile and adjustable dolly further comprising an electric wheel drive system in operational engagement with at least one of said central wheel, the first distal wheel, and the second distal wheel, the method further comprising a step of:

operating said electric wheel drive system causing rotation of said engaged at least one of said central wheel, the first distal wheel, and the second distal wheel.

18. A method of utilizing a mobile and adjustable dolly for moveably supporting an object as recited in claim 10, the mobile and adjustable dolly further comprising an automated pivotal support member angle adjustment system comprising an automated pivotal support member angle adjusting element which angularly positions said first pivotal support member and said second pivotal support member with one another, wherein said step of adjusting said angle defined between longitudinal axis of each of said first pivotal frame member and said second pivotal frame member to position each of said pair of vehicle support columns in registration with target support location of said object is accomplished by operating said automated pivotal support member angle adjustment system.

19. A method of utilizing a mobile and adjustable dolly for moveably supporting an object as recited in claim 10, the mobile and adjustable dolly further comprising an hydraulic vertical support element adjustment system comprising a vertically adjusting element which vertically positions each vertically adjustable element, wherein said vertically adjusting element vertically positions each object support element, wherein said step of vertically adjustable element, positioning said object support element at a desired height for engaging and supporting said target support location of said object is accomplished by operating said hydraulic vertical support element adjustment system.

20. A method of utilizing a mobile and adjustable dolly for moveably supporting an object as recited in claim 10, the mobile and adjustable dolly further comprising an electric vertical support element adjustment system comprising a vertically adjusting element which vertically positions each vertically adjustable element, wherein said vertically adjusting element vertically positions each object support element, wherein said step of vertically adjustable element, positioning said object support element at a desired height for engaging and supporting said target support location of said object is accomplished by operating said electric vertical support element adjustment system.

* * * * *